United States Patent
Hanna

(10) Patent No.: US 10,056,744 B2
(45) Date of Patent: Aug. 21, 2018

(54) APPARATUS FOR SELECTIVELY OPENING UP A PORTION OF A CABLE

(71) Applicant: SWORD OILFIELD SERVICES PTE. LTD., Singapore (SG)

(72) Inventor: Rafik Boshra Hanna, Singapore (SG)

(73) Assignee: Sword Oilfield Services Pte. Ltd., Singapore (SG)

( * ) Notice: Subject to any disclaimer, the term of this patent is extended or adjusted under 35 U.S.C. 154(b) by 0 days.

(21) Appl. No.: 15/103,182

(22) PCT Filed: Dec. 12, 2013

(86) PCT No.: PCT/SG2013/000530
§ 371 (c)(1),
(2) Date: Jun. 9, 2016

(87) PCT Pub. No.: WO2015/088440
PCT Pub. Date: Jun. 18, 2015

(65) Prior Publication Data
US 2016/0308338 A1 Oct. 20, 2016

(51) Int. Cl.
| | | |
|---|---|---|
| H02G 1/12 | (2006.01) | |
| H01R 43/00 | (2006.01) | |
| D07B 7/18 | (2006.01) | |
| H02G 1/16 | (2006.01) | |
| H01R 43/033 | (2006.01) | |

(52) U.S. Cl.
CPC ............ *H02G 1/1292* (2013.01); *D07B 7/18* (2013.01); *H01R 43/033* (2013.01); *H02G 1/1224* (2013.01); *H02G 1/16* (2013.01); *D07B 7/182* (2015.07); *D07B 2301/45* (2013.01); *H02G 1/1297* (2013.01)

(58) Field of Classification Search
CPC ...... H02G 1/1292; H02G 1/1224; H02G 1/16; H02G 1/1297; H01R 43/033; B21F 13/00
See application file for complete search history.

(56) References Cited

U.S. PATENT DOCUMENTS

| | | |
|---|---|---|
| 3,707,836 A | 1/1973 | Lovett |
| 4,192,057 A | 3/1980 | Borelly et al. |
| 5,208,077 A | 5/1993 | Proctor et al. |
| 2002/0134482 A1 | 9/2002 | Takagi |
| 2004/0258915 A1 | 12/2004 | Hasui et al. |

FOREIGN PATENT DOCUMENTS

| | | |
|---|---|---|
| GB | 463115 A | 3/1937 |
| WO | 0221654 A1 | 3/2002 |

OTHER PUBLICATIONS

Australian Patent Office Search Report dated Jan. 30, 2014 in reference to co-pending International Application No. PCT/SG2013/000530 filed Dec. 12, 2013.
European Patent Office Search Report dated Jul. 6, 2017 in reference to co-pending European Patent Application No. EP13899100.

*Primary Examiner* — Teresa M Ekiert
(74) *Attorney, Agent, or Firm* — Dinsmore & Shohl LLP

(57) ABSTRACT

An apparatus (10) for selectively opening up a portion of a cable (12) is provided. The apparatus (10) includes a first guide (14) arranged to receive a core (16) of the cable (12). A second guide (18, 20) is spaced laterally apart from the first guide (14) and is arranged to receive one or more outer wires (22, 24) of the cable (12). The second guide (18, 20) is also arranged to draw a portion of the one or more outer wires (22, 24) of the cable (12) away from the core (16) of the cable (12) as the cable (12) is passed through the apparatus (10) when in use.

13 Claims, 4 Drawing Sheets

APPARATUS FOR SELECTIVELY OPENING UP A PORTION OF A CABLE

FIELD OF THE INVENTION

The present invention relates to cabling technology and more particularly to an apparatus for selectively opening up a portion of a cable.

BACKGROUND OF THE INVENTION

Wires forming a cable are usually wound very tightly together making it exceedingly difficult to penetrate the outer layers of the cable to get to the inner layers. This, coupled with the typical lengthiness of a cable, makes repair of damaged cables a challenge, as it is not practical or economical to unwind a considerable length of cable just to repair a portion of the cable.

Currently, when a cable is damaged, either the cable is cut into two at the damaged portion so that repair work can be performed or the damaged portion of the cable is cut away. Once the repair work is done or the damaged portion removed, the cut ends of the cable are spliced back together.

However, the overall performance of a spliced cable is not as good as before and in some instances, a spliced cable may even become unworkable and end up having to be junked.

Due to similar constraints, it is also impossible to perform a proper visual inspection of the inner layers of a cable for preventive maintenance.

Cable repairs also require very qualified persons with many years of experience and there are fewer and fewer such persons around nowadays.

In view of the foregoing, it would be desirable, therefore, to have an apparatus that is able to selectively open up a portion of a cable.

SUMMARY OF THE INVENTION

Accordingly, in a first aspect, the present invention provides an apparatus for selectively opening up a portion of a cable. The apparatus includes a first guide arranged to receive a core of the cable. A second guide is spaced laterally apart from the first guide and is arranged to receive one or more outer wires of the cable. The second guide is also arranged to draw a portion of the one or more outer wires of the cable away from the core of the cable as the cable is passed through the apparatus when in use.

Other aspects and advantages of the invention will become apparent from the following detailed description, taken in conjunction with the accompanying drawings, illustrating by way of example the principles of the invention.

BRIEF DESCRIPTION OF THE DRAWINGS

The following detailed description of embodiments of the invention will be better understood when read in conjunction with the appended drawings. The present invention is illustrated by way of example and is not limited by the accompanying figures, in which like references indicate similar elements. It is to be understood that the drawings are not to scale and have been simplified for ease of understanding the invention.

DETAILED DESCRIPTION OF EXEMPLARY EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

The term "cable" as used throughout this disclosure refers to any and all linear collections of piles, yarns, strands, wire armour, hoses, electric or non-electric cables that are twisted or braided together in order to combine them into a larger and stronger form. Examples include, but are not limited to, ropes, braided lines, wire rope, logging cables, and seismic and robotic control hoses.

Figure 1:
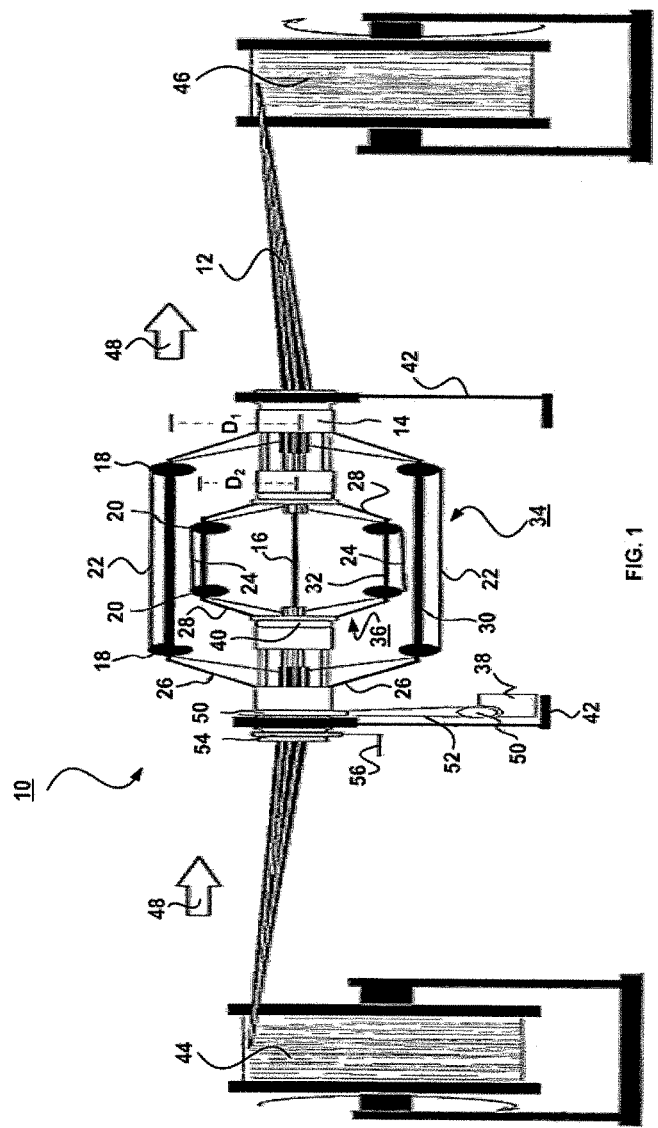
FIG. 1 is a schematic cross-sectional side view of an apparatus for selectively opening up a portion of a cable in accordance with one embodiment of the present invention.

Referring now to FIG. 1, an apparatus 10 for selectively opening up a portion of a cable 12 is shown. The apparatus 10 includes a first guide 14 arranged to receive a core 16 of the cable 12 and a second guide 18 and 20 spaced laterally apart from the first guide 14 and arranged to receive a plurality of outer wires 22 and 24 of the cable 12. In the embodiment shown, a plurality of first support members 26 and 28 couples the first guide 14 to the second guide 18 and 20 and a plurality of second support members 30 and 32 couples respective ones of a plurality of guiding elements 18 and 20 of the second guide 18 and 20 to corresponding ones of the guiding elements 18 and 20, the first and second support members 26, 28, 30 and 32 being arranged to define a wire support structure 34 and 36 with the second guide 18 and 20. A drive arrangement 38 and 40 is arranged to rotate the second guide 18 and 20 around an axis of the cable 12. A pair of stands 42 is provided to support the first guide 14 at a predetermined or desired height.

The cable 12 is spooled between a first drum 44 and a second drum 46 and passes through the apparatus 10 in the process of being spooled. The position of the apparatus 10 along the length of the cable 12 is thus variable and can be adjusted by spooling the cable 12 accordingly.

As the cable 12 is being spooled, for example, in the direction indicated by the arrows 48, the portion of the cable 12 passing through the apparatus 10 is unwound and opened up by the apparatus 10 to expose the core 16 of the cable 12. More particularly, the outer wires 22 and 24 are unwound and separated from the core 16 of the cable 12 by the second guide 18 and 20 and spread apart, thereby exposing the core 16 of the cable 12. Once past the second guide 18 and 20, the outer wires 22 and 24 rejoin the core 16 of the cable 12 and are rewound around the core 16 of the cable 12. The cable 12 ahead of and trailing behind the apparatus 10 are both fully formed and can thus be spooled on the first and second drums 44 and 46.

In this manner, the apparatus 10 selectively opens up a window in the cable 12, thereby allowing, for example, access of tools to the core 16 of the cable 12 for repair work without having to cut the cable 12 in two. Accordingly, the apparatus 10 is particularly useful in instances where sheer length of the cable 12 and the complexity of cable construction hinder repair, modification and/or inspection of the cable 12.

In the embodiment shown, the first guide 14 is of a pipe-like structure. The cable 12 enters through a first hole at one end of the first guide 14 and exits from a second hole at the other end of the first guide 14.

The second guide 18 and 20 is arranged to draw a portion of the one or more outer wires 22 and 24 of the cable 12 away from the core 16 of the cable 12 as the cable 12 is passed through the apparatus 10 when in use. In the present embodiment, the second guide 18 and 20 includes a plurality of first guiding elements 18 and a plurality of second guiding elements 20. The first and second guiding elements 18 and 20 are concentrically arranged around the axis of the cable 12. The first guiding elements 18 are at a first lateral displacement $D_1$ from the first guide 14 and the second guiding elements 20 are at a second lateral displacement. $D_2$ from the first guide 14, the first lateral displacement $D_1$ being greater than the second lateral displacement $D_2$. As can be seen from FIG. 1, the first guiding elements 18 open up the outermost layer of wires 22 forming an outer armour of the cable 12 and the second guiding elements 20 open up the next layer of wires 24 forming an inner armour of the cable 12. In the present embodiment, the first guiding elements 18 together with the corresponding first and second support members 26 and 30 define a first wire support structure 34 for the wires 22 forming the outer armour of the cable 12 and the second guiding elements 20 together with the corresponding first and second support members 28 and 32 define a second wire support structure 36 for the wires 24 forming the inner armour of the cable 12.

Although two (2) sets of guiding elements 18 and 20 are illustrated in the present embodiment, it should be understood by those of ordinary skill in the art that the present invention is not limited by the number of sets of guiding elements in the apparatus 10. In alternative embodiments, fewer or more sets of guiding elements may be provided with the apparatus 10 depending on the situational and/or cable requirements. For example, if a cable has two (2) layers of armour and inspection of only the inner armour is required, then only one (1) set of guiding elements is required to open up the outer armour for inspection of the inner armour. If however the core of such a cable is to be inspected, then two (2) sets of guiding elements are required to open up the outer and inner armours, respectively, for inspection of the cable core. One or more additional sets of guiding elements may be required if the cable has more than two (2) layers of armour.

The first and second guiding elements 18 and 20 at two (2) ends of the cable 12 help keep the outer wires 22 and 24 in line when in motion.

In the present embodiment, the first and second guiding elements 18 and 20 are rollers. Nevertheless, it should be understood by those of ordinary skill in the art that the guiding elements of the present invention are not restricted to rollers and could be any device that guides while allowing or facilitating the passage or movement of the wires 22 and 24 through the apparatus 10 in alternative embodiments.

Each of the first support members 26 and 28 in the present embodiment is moveable between a first position and a second position, the lateral displacement $D_1$ and $D_2$ between the first guide 14 and the second guide 18 and 20 being greater when the first support members 26 and 28 are in the first position than when in the second position. The lateral displacement $D_1$ and $D_2$ between the first guide 14 and the second guide 18 and 20 is thus variable. Advantageously, this provides flexibility in determining how large an opening to create in the cable 12.

In the first position, the first support members 26 and 28 may provide support to the wires 22 forming the outer armour and the wires 24 forming the inner armour. When repair work is required, the first support members 26 and 28 may be moved into the second position to create an area of loose or excess wires around the core 16 of the cable 12. Advantageously, this permits access to inner layers of the cable 12 for inspection or repair and insertion of tools for repair work if required. Once the repair work is completed, the first support members 26 and 28 may be returned to the first position, putting the wires 22 and 24 under tension again.

In one exemplary embodiment, the first support members 26 and 28 may be collapsible arms 26 and 28 coupled to the first guide 14. When repair work is required, the collapsible arms 26 and 28 may be collapsed or closed to create an area of loose or excess wires around the core 16 of the cable 12. Once the repair work is completed, the collapsible arms 26 and 28 may be reopened, putting the wires 22 and 24 under tension again. In an alternative embodiment, the first support members 26 and 28 may be flexible spring loaded arms.

The drive arrangement 38 and 40 in the present embodiment includes a first motor 38 that is arranged to rotate the first guiding elements 18 in a first direction around the axis of the cable 12 and a second motor 40 that is arranged to rotate the second guiding elements 20 in a second direction opposite to the first direction. In the present embodiment, the first motor 38 rotates the first wire support structure 34 via a system of pulleys 50 with a belt 52 connecting the pulleys 50 and the second motor 40 is a hollow core motor that rotates with the first guide 14 to which the second motor 40 is coupled and that has a motor core or shaft that rotates the second wire support structure 36 in an opposite direction. The directions of rotation of the first and second wire support structures 34 and 36 are dependent on the design of the cable 12. In the present embodiment, a slip ring 54 is provided with the first guide 14 to allow transmission of power from a power source to the second motor 40 without twisting a power cable 56. The first and second motors 38 and 40 may be manually, electrically, pneumatically or hydraulically powered.

To mount the cable 12 on the apparatus 10, a length of the cable 12 is first spooled off from one of the cable drums 44 and 46 and passed as a whole through a first end of the first guide 14 before unwrapping or unwinding a length of the wires 22 forming the outer armour, opening up and spreading the wires 22 forming the outer armour over the first guiding elements 18 and the first wire support structure 34. The remaining cable comprising the inner armour and the core 16 is then passed through the next section of the first guide 14 before unwrapping or unwinding a length of the wires 24 forming the inner armour, separating and spreading the wires 24 forming the inner armour over the second guiding elements 20 and the second wire support structure 36. Once past the second guiding elements 20, the wires 24 forming the inner armour are rewrapped or rewound over the core 16 of the cable 12 before passing through the next section of the first guide 14. The wires 22 forming the outer armour are next rewrapped or rewound around the inner armour of the cable 12 before passing the reassembled cable 12 through a second end of the first guide 14 and connecting the cable 12 to the other of the cable drums 44 and 46.

Once the cable 12 is installed on the apparatus 10, spooling of the cable 12 may be commenced at a slow speed and the first and second motors 38 and 40 may be started to rotate the first and second wire support structures 34 and 36 in opposite directions around the axis of the cable 12. The spooling and motor speeds may be adjusted to allow smooth unwrapping and rewrapping of the wires 22 and 24 forming the inner and outer armours of the cable 12.

The cable 12 may be spooled until a damaged portion of the cable 12 is reached and at that point, the spooling of the cable 12 and the rotations of the first and second wire support structures 34 and 36 may be stopped and cable repair or inspection proceeded with at the point of interest.

After the repair or inspection is completed, the cable 12 may continue to be spooled until one of the ends of the cable 12 is reached and the cable 12 is then removed from the apparatus 10.

If desired, the first support members 26 and 28 may be moved into the second position to create an area of loose or excess wires around the core 16 of the cable 12 when the apparatus 10 is at the damaged portion of the cable 12. The first support members 26 and 28 may be moved back into the first position to put the wires 22 and 24 under tension again after the repair or inspection is completed and before removing the cable 12 from the apparatus 10.

Figure 2:
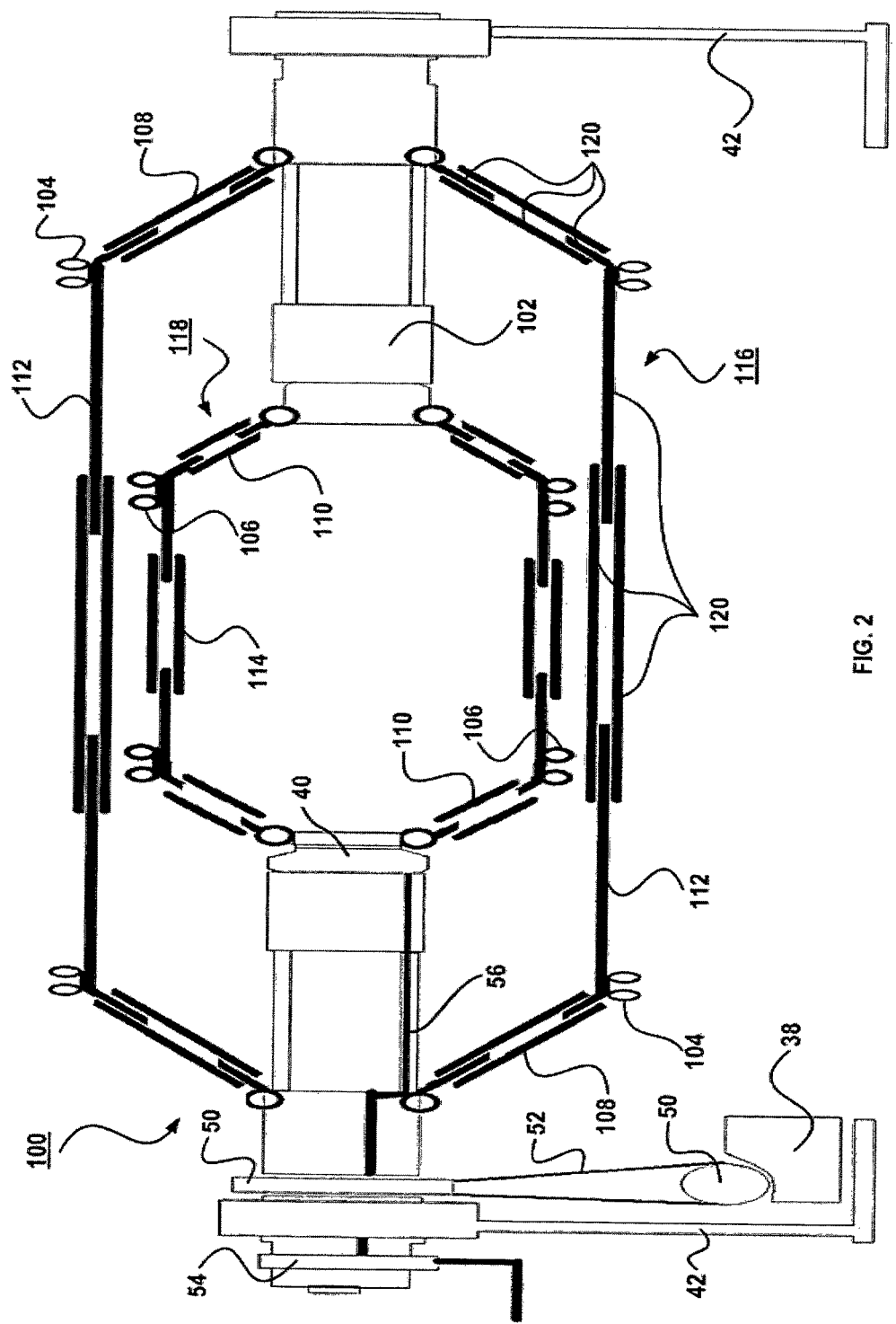
FIG. 2 is a schematic cross-sectional side view of an apparatus for selectively opening up a portion of a cable in accordance with another embodiment of the present invention.

Referring now to FIG. 2, an apparatus 100 for selectively opening up a portion of a cable in accordance with another embodiment of the present invention is shown. The apparatus 100 includes a first guide 102 arranged to receive a core of the cable and a second guide 104 and 106 spaced laterally apart from the first guide 102 and arranged to receive one or more outer wires of the cable. In the embodiment shown, a plurality of first support members 108 and 110 couples the first guide 102 to the second guide 104 and 106 and a plurality of second support members 112 and 114 couples respective ones of a plurality of guiding elements 104 and 106 of the second guide 104 and 106 to corresponding ones of the guiding elements 104 and 106, the first and second support members 108, 110, 112 and 114 being arranged to define a wire support structure 116 and 118 with the second guide 104 and 106. A drive arrangement 38 and 40 is arranged to rotate the second guide 104 and 106 around an axis of the cable. A pair of stands 42 is provided to support the first guide 102 at a predetermined or desired height.

The apparatus 100 differs from the earlier described embodiment in two ways.

Firstly, the first and second guiding elements 104 and 106 in the present embodiment are loops 104 and 106 through which one or more wires of the cable are inserted when in use, the loops 104 and 106 helping to keep the wires of the cable in place.

A second difference is that the first and second support members 108, 110, 112 and 114 are provided in a sliding arm arrangement with each of the first and second support members 108, 110, 112 and 114 defining the wire support structure 116 and 118 including a plurality of support elements 120 arranged in a slidable relationship. In the present embodiment, each of the first and second support members 108, 110, 112 and 114 is thus of a variable length being extendable or retractable as desired based on situational requirements.

Figure 3:
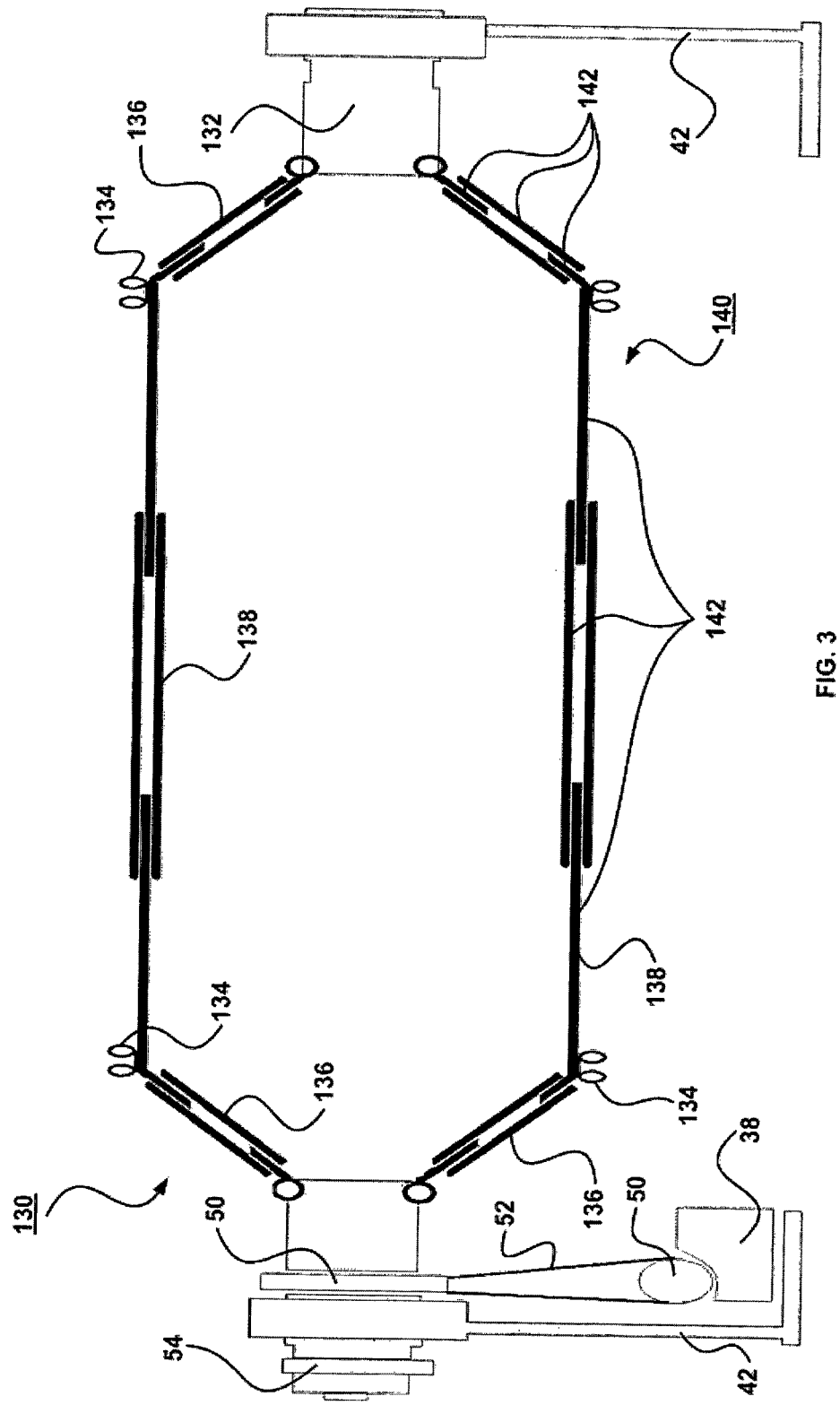
FIG. 3 is a schematic cross-sectional side view of an apparatus for selectively opening up a portion of a cable in accordance with still another embodiment of the present invention.

Referring now to FIG. 3, an apparatus 130 for selectively opening up a portion of a cable in accordance with still another embodiment of the present invention is shown. The apparatus 130 includes a first guide 132 arranged to receive a core of the cable and a second guide 134 spaced laterally apart from the first guide 132 and arranged to receive one or more outer wires of the cable. In the embodiment shown, a plurality of first support members 136 couples the first guide 132 to the second guide 134 and a plurality of second support members 138 couples respective ones of a plurality of guiding elements 134 of the second guide 134 to corresponding ones of the guiding elements 134, the first and second support members 136 and 138 being arranged to define a wire support structure 140 with the second guide 134. Each of the first and second support members 136 and 138 defining the wire support structure 140 includes a plurality of support elements 142 arranged in a slidable relationship. A drive arrangement 38 is arranged to rotate the second guide 134 around an axis of the cable. A pair of stands 42 is provided to support the first guide 132 at a predetermined or desired height.

The apparatus 130 differs from the earlier described embodiments in that only one (1) set of guiding elements 134 is illustrated in the present embodiment. In alternative embodiments, more than one (1) such apparatus 130 may be used concurrently and coaxially together to open up additional layers of a cable.

Figure 4:
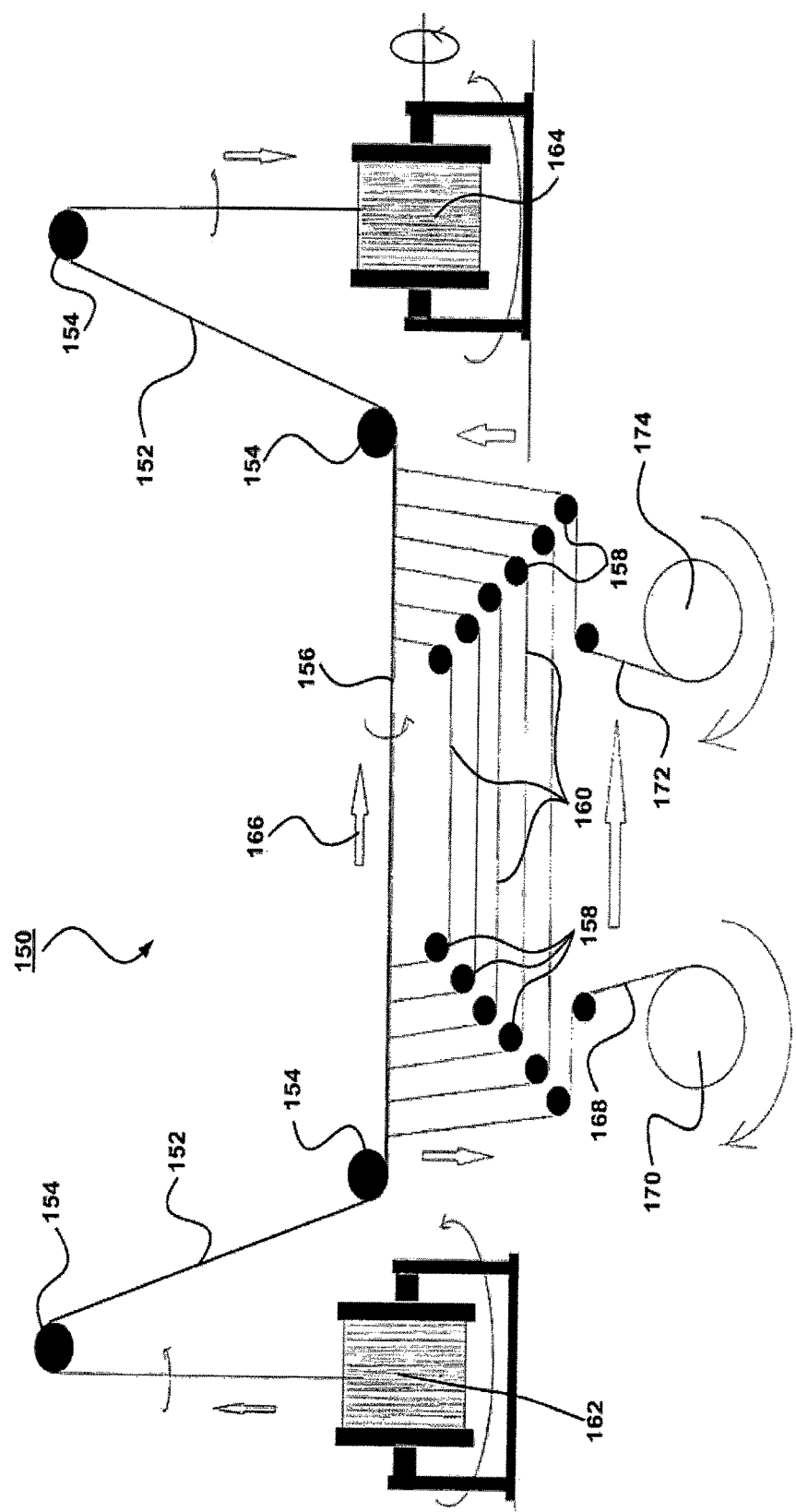
FIG. 4 is a schematic cross-sectional side view of an apparatus for selectively opening up a portion of a cable in accordance with yet another embodiment of the present invention.

Referring now to FIG. 4, an apparatus 150 for selectively opening up a portion of a cable 152 in accordance with yet another embodiment of the present invention is shown. The apparatus 150 includes a first guide 154 arranged to receive a core 156 of the cable 152 and a second guide 158 spaced laterally apart from the first guide 154 and arranged to receive one or more outer wires 160 of the cable 152.

The cable 152 is spooled between a first drum 162 and a second drum 164 and passes through the apparatus 150 in the process of being spooled. The position of the apparatus 150 along the length of the cable 152 is thus variable and can be adjusted by spooling the cable 152 accordingly. As can be seen from FIG. 4, the second guide 158 is arranged to draw a portion of the one or more outer wires 160 of the cable 152 away from the core 156 of the cable 152 as the cable 152 is passed through the apparatus 150 when in use.

As the cable 152 is being spooled, for example, in the direction indicated by the arrow 166, the portion of the cable 152 passing through the apparatus 150 is opened up by the apparatus 150 to expose the core 156 of the cable 152. More particularly, the outer wires 160 are separated from the core 156 of the cable 152 by the second guide 158, thereby exposing the core 156 of the cable 152. Once past the second guide 158, the outer wires 160 rejoin the core 156 of the cable 152. The cable 152 ahead of and trailing behind the apparatus 150 are both fully formed and can thus be spooled on the first and second drums 162 and 164. In this manner, the apparatus 150 selectively opens up a window in the cable 152, thereby allowing, for example, access of tools to the core 156 of the cable 152 for repair work without having to cut the cable 152 in two.

In the embodiment shown, the first guide 154 is a series of rollers.

In the present embodiment, the wires 160 forming the outer armour are spread out by the second guide 158 and move forward in a single plane (without rotating about the axis of the cable 152 unlike the earlier embodiments) as the cable 152 is being spooled from the first drum 162 to a second drum 164. Advantageously, apart from facilitating access to the core 156 of the cable 152, this also allows submersion of the wires 160 forming the outer armour in chemicals for cleaning or coating purposes.

As can be seen from FIG. 4, the apparatus 150 may further advantageously be used to replace a completely damaged wire with a new one. This may be performed by spooling off a damaged wire 168 drawn away from the core 156 of the cable 152 by one of a plurality of guiding elements 158 of the second guide 158 to a first side drum 170 and spooling in a new wire 172 from a second side drum 174 in place of the damaged wire 168, thereby replacing the damaged wire 168.

Although illustrated in FIGS. 1 and 4 as separating a plurality of outer wires from the core of the cable, it should be understood that the apparatus of the present invention is not limited to application on a plurality of outer wires. The apparatus of the present invention may be used to draw out a single wire simply by having the desired wire received in the second guide and the remaining cable received in the first guide.

As is evident from the foregoing discussion, the present invention provides an apparatus that is able to selectively open up a portion of a cable. The apparatus creates a loop or loops of wire at either end of a cable and moves the loop or loops laterally in a rotational motion relative to the cable to a desired point or location in the cable to allow a user to perform visual and/or physical operations (such as, but not limited to, repair, inspection and modification) on the cable at that point before moving the loop or loops back out of the cable after work is completed. With the apparatus of the present invention, cable repairs may be performed more quickly than with current methods as splicing is a slow process. The apparatus of the present invention also enables internal inspection of cables for signs of wear and tear in the inner layers. Further advantageously, the apparatus of the present invention is simple to use and reduces the requirement for persons with high expertise in splicing cables. The apparatus of the present invention is particularly useful in instances where the sheer length of the cable and the complexity of cable construction hinder, repair, modification and/or inspection of the cable.

While preferred embodiments of the invention have been illustrated and described, it will be clear that the invention is not limited only to the described embodiments. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. An apparatus for selectively opening up a portion of a cable, the apparatus comprising:
a first guide arranged to receive a core of the cable;
a second guide spaced laterally apart from the first guide and arranged to receive one or more outer wires of the cable; and
a plurality of first support members coupling the first guide to the second guide,
wherein the second guide is arranged to draw a portion of the one or more outer wires of the cable away from the core of the cable as the cable is passed through the apparatus when in use, and
wherein a lateral displacement between the first guide and the second guide is variable, and
wherein each of the first support members is moveable between a first position and a second position and wherein a lateral displacement between the first guide and the second guide is greater when the first support members are in the first position than when in the second position.

2. The apparatus of claim 1, wherein each of the first support members is of a variable length.

3. The apparatus of claim 1, further comprising a plurality of second support members, wherein the first and second support members are arranged to define a wire support structure with the second guide.

4. The apparatus of claim 3, wherein each of the first and second support members defining the wire support structure comprises a plurality of support elements arranged in a slidable relationship.

5. The apparatus of claim 1, wherein the second guide is rotatable around an axis of the cable.

6. The apparatus of claim 1, wherein the second guide comprises a plurality of first guiding elements and a plurality of second guiding elements, wherein the first guiding elements are at a first lateral displacement from the first guide and the second guiding elements are at a second lateral displacement from the first guide, the first lateral displacement being greater than the second lateral displacement.

7. The apparatus of claim 6, wherein the first guiding elements are rotatable in a first direction around an axis of the cable and the second guiding elements are rotatable in a second direction opposite to the first direction.

8. An apparatus for selectively opening up a portion of a cable, the apparatus comprising:
a first guide arranged to receive a core of the cable; and
a second guide spaced laterally apart from the first guide and arranged to receive one or more outer wires of the cable,
wherein the second guide is arranged to draw a portion of the one or more outer wires of the cable away from the core of the cable as the cable is passed through the apparatus when in use, and
wherein the second guide comprises a plurality of first guiding elements and a plurality of second guiding elements, wherein the first guiding elements are at a first lateral displacement from the first guide and the second guiding elements are at a second lateral displacement from the first guide, the first lateral displacement being greater than the second lateral displacement, and
wherein the first guiding elements are rotatable in a first direction around an axis of the cable and the second guiding elements are rotatable in a second direction opposite to the first direction.

9. An apparatus for selectively opening up a portion of a cable, the apparatus comprising:
a first guide arranged to receive a core of the cable;
a second guide spaced laterally apart from the first guide and arranged to receive one or more outer wires of the cable; and
a plurality of first support members coupling the first guide to the second guide,
wherein the second guide is arranged to draw a portion of the one or more outer wires of the cable away from the core of the cable as the cable is passed through the apparatus when in use, and
wherein each of the first support members is moveable between a first position and a second position and wherein a lateral displacement between the first guide and the second guide is greater when the first support members are in the first position than when in the second position.

10. The apparatus of claim 9, wherein each of the first support members is of a variable length.

11. The apparatus of claim 9, further comprising a plurality of second support members, wherein the first and second support members are arranged to define a wire support structure with the second guide.

12. The apparatus of claim 11, wherein each of the first and second support members defining the wire support structure comprises a plurality of support elements arranged in a slidable relationship.

13. The apparatus of claim 9, wherein the second guide is rotatable around an axis of the cable.

* * * * *